(12) United States Patent
Lansbergen et al.

(10) Patent No.: US 6,312,752 B1
(45) Date of Patent: Nov. 6, 2001

(54) EDIBLE FAT BASED FLAKES

(75) Inventors: Gabriel Jacobus T. Lansbergen, AT Vlaardingen (NL); Shirley Irvine, Rexdale (CA)

(73) Assignee: Unilever Patent, Vlaardingen (NL)

( * ) Notice: Subject to any disclaimer, the term of this patent is extended or adjusted under 35 U.S.C. 154(b) by 0 days.

(21) Appl. No.: 09/709,319

(22) Filed: Nov. 13, 2000

Related U.S. Application Data

(63) Continuation-in-part of application No. 09/440,843, filed on Nov. 16, 1999, now abandoned.

(51) Int. Cl.⁷ .................................................. A23D 9/00
(52) U.S. Cl. .................. 426/607; 426/555; 426/549; 426/560; 426/638; 426/640; 426/650
(58) Field of Search .................. 426/607, 555, 426/650, 560, 640, 549, 638

(56) References Cited

U.S. PATENT DOCUMENTS

| | | | |
|---|---|---|---|
| 3,508,929 | * 4/1970 | Callaghan | 426/555 |
| 3,589,914 | * 6/1971 | Cooper | 426/560 |
| 3,892,880 | * 7/1975 | Grolitsch | 426/555 |
| 4,045,588 | * 8/1977 | Wieske | 426/607 |
| 4,343,826 | * 8/1982 | McNaught | 426/601 |
| 4,360,534 | * 11/1982 | Brabbs | 426/560 |
| 4,514,430 | * 4/1985 | Hartman | 426/549 |
| 4,578,274 | * 3/1986 | Sugisawa | 426/96 |
| 4,645,673 | * 2/1987 | Wilmes | 426/94 |
| 4,891,233 | * 1/1990 | Belanger | 426/555 |
| 5,061,506 | * 10/1991 | Leach | 426/607 |
| 5,064,670 | * 11/1991 | Hirshorn | 426/607 |
| 5,094,860 | * 3/1992 | Newhall | 426/640 |
| 5,268,191 | * 12/1993 | Crosby | 426/606 |
| 5,354,572 | * 10/1994 | Miller | 426/580 |
| 5,356,643 | * 10/1994 | Miller | 426/94 |
| 5,370,881 | * 12/1994 | Fuisz | 426/5 |
| 5,431,945 | * 7/1995 | Miller | 426/580 |
| 5,447,735 | * 9/1995 | Miller | 426/285 |
| 5,667,837 | * 9/1997 | Broomhead | 426/607 |
| 5,690,985 | * 11/1997 | VanMeeteren | 426/607 |
| 5,888,575 | * 3/1999 | Lansbergen | 426/607 |
| 5,895,675 | * 4/1999 | Carment | 426/99 |

FOREIGN PATENT DOCUMENTS

| | | | |
|---|---|---|---|
| 2176143 | * 12/1986 | (GB) . | |
| WO-9424882 | * 11/1994 | (WO) | 426/607 |

* cited by examiner

*Primary Examiner*—Carolyn Paden
(74) *Attorney, Agent, or Firm*—Pillsbury Winthrop LLP

(57) ABSTRACT

Fat based flakes with improved product performance and which flakes are easier to make than known flakes have the composition:

0 to 2 wt % moisture 25 to 90 wt % of a bakery compatible fat, which fat displays a (Crystal-5 value of at least 40% and a ratio of (Crystal-5: $N_{20}$) of at least 0.55

0 to 80 wt % of a sugar 0 to 70 wt % of a filler while the flakes have a size of 0.05 mm to 2.5 cm.

8 Claims, No Drawings

EDIBLE FAT BASED FLAKES

This is Continuation-in-Part National application Ser. No. 09/440,843 filed Nov. 16, 1999 now abandoned.

BACKGROUND OF THE INVENTION

Edible fat based, flavoured fat systems suitable for use in baked goods and snacks are known from U.S. Pat. No. 5,431,945 or U.S. Pat. No. 4,356,643 or U.S. Pat. No. 5,447,735. From these documents butter based fat flakes are disclosed in U.S. '945. These flakes are free of sugar and contain a lot of predried butter fat and high contents of dried milk solids. Particulars of the fats that can be applied are not given, all that is said about the nature of the fats that can be applied is that they are related to butter fat. According to U.S. '643 cheese based flakes can be obtained along lines that are very similar to the lines set out above for U.S. '945. These flakes contain high levels of dried cheese solids while the fats that can be applied are the same or very similar to the fats according to above U.S. '945. According to U.S. '735 cinnamon based flakes can be obtained that contain large amounts of granulated sugar while the fat is again a butter fat or a fat, closely related to butter fat.

The processing of the flakes in all three above US documents is very complicated and require a tempering step which is costly and difficult to perform in practise. We therefore performed a study to find out whether we could find compositions for the flakes, in particular for the fat in the flakes that would enable an easier processing. During this study we found that one of the main problems related with the use of butter fat or butter fat related fats is the slow crystallisation rate of the fats. Because of this slow crystallisation rate a tempering step had to be used. We found that if the fats display a (Crystal-5)-value of at least 40%, (crystal-5 being the amount of crystallised fat, obtained after cooling the fat to 20° C. for 5 minutes) and have a specific ratio between Crystal-5 and its $N_{20}$-value this tempering can be avoided and improved products can be obtained in a shorter time while using easier processing. Simultaneously our novel bakery products, made from these flakes, displayed an excellent snap.

GB 2 176 143 discloses fat flakes or fat granules, wherein the fat applied is selected from margarine, butter or lard (p.1,l.13-14). These flakes are used for cooking purposes and not as an ingredient for the preparation of bakery products, wherein the flakes must give a good flavour boost and must provide the bakery products with a good snap. As margarine and butter are fat emulsions containing about 20 wt % of water the use thereof in flakes that contain sugars is very limited because the sugars will be dissolved in the water phase of the fat emulsion and cannot contribute to the flavour boost nor to the snap of the products. Moreover the use of butter also has the drawbacks set out above. Lard is a fat that is relatively soft and has a low crystal-5 value, therefore the use thereof in flakes will lead to unacceptable products.

U.S. Pat. No. 4,045,588 concerns with the use of fats with at least 40% polyunsaturated fatty acids for margarines. Nothing is disclosed about the use of these fats in fat flakes for bakery applications that are supposed to provide a flavour boost and a snap. Moreover the fats according to this document have relatively high trans contents that we prefer to avoid.

SUMMARY OF THE INVENTION

Therefore our invention in the first instance concerns edible fat based, flavoured fat systems suitable for use in baked goods and snacks comprising:

0 to 2 wt % of moisture;

1 to 15 wt % of a flavouring system;

25 to 90 wt % of a bakery compatible fat having a triglyceride composition such that the fat displays a ratio (Crystal 5:N20) i.e. a ratio between the amount of crystallised fat obtained after cooling the fat to 20° C. for 5 minutes (=Crystal 5) using a cooling bath of about 20° C. and the N-value obtained by NMR pulse on a non-stabilised fat at 20° C. (=N20) of more than 0.55, preferably more than 0.60 and preferably also such that it comprises the triglycerides H3, H2M and H2E in a total amount (H3+H2M+H2E) of more than 30 wt % (on total glycerides present), preferably more than 35 wt % and the triglycerides H2U in an amount of less than 25 wt % (on total glycerides), the balance being other glycerides based on H,M,U and E, wherein H=saturated fatty acid with 16–24 C-atoms; M=saturated fatty acids with 10–14 c-atoms; E=elaidic acid and U=mainly cis unsaturated fatty acids with at least 18 C-atoms 0 to 80 wt % of sugar;

0 to 70 wt % of a filler material;

which edible fat based systems have a particle size between 0.05 mm and 2.5 cm.

These products displayed excellent crystallisation behaviour.

DESCRIPTION OF THE PREFERRED EMBODIMENTS

The amount of crystallised fat obtained after crystallisation for 5 min at 20° C. is the amount of fat that is crystallised, after the fat is melted at 60° C. in NMR-tubes and kept at 60° C. for 1 hour and then cooled from a temperature of 60° C. to 20° C. while the time is counted from the moment the cooling is started.

The N20 value is the solid fat content for the fat as measured by well known NMR pulse measurement on a fat that is not stabilised i.e. the fat was subjected to the following T-regime prior to measuring the N value: the fat is melted at 60° C. and kept at 60° C. for 1 hour, the fat is then cooled to 0° C. and kept at 0° C. for 30 min, then the fat is heated to 20° C. and kept thereon for 1 hr prior to measuring the solid fat content at 20° C.

Although all sugars can be applied in our products we have a preference for one or more of the following sugars: sucrose, dextrose, fructose and glucose.

The fats that can be used in our invention in fact can be selected from the group consisting of partially and fully hardened vegetable oils, in particular partially hardened soybean oil, partially hardened cotton seed oil, partially hardened sunflower oil, partially hardened rape seed oil, partially hardened palm oil, blends thereof with liquid oils and interesterified mixtures thereof as long as these fats display the (Crystal 5:N20) ratio. Preferred fats are fats that are composed of natural ingredients and that are free of GM fats.

By using above fat systems we also found that it is possible now to use all kind of flavouring system. This is very beneficial over the technology disclosed in U.S. '735 wherein the flavouring system must be a solid system.

Therefore according to another embodiment of our invention it is now possible to select the flavouring system from the group consisting of natural flavours from fruit like oranges, strawberries, raspberries, blueberries, goose berries, redberries, blackberries, apples, pears, peaches, apricots, from nuts, like walnuts, hazelnuts, from spices or herbs like cinnamon, ginger, nutmeg, cloves, allspice, maple sugar, dehydrated maple syrup, from edible acids like citric acid, malic acid or lactic acid, from synthetic flavours imitating above natural flavours, from butter, from cheese, or mixtures thereof. These systems then can be used as one of the following systems: as finely divided solid flavours; or as finely divided solid or liquid flavours on a solid carrier, or as liquid flavours, or as microcapsules containing a solid, or liquid, or gaseous flavour.

The filler that can be present in our compositions is used to structure the flakes while not or hardly contributing to the caloric value of the flakes. Fillers that can be applied can be selected from the group consisting of flour, starches (natural and modified), gums, hydrocolloids, maltodextrin, fibres, butter milk powder, skimmed milk powder, whey powder, and cellulose.

In addition to above components also savory components can be present. Examples hereof are savory culinary aids such as tomato, meat products such as ham or pepperoni, garlic, and olive oil. Moreover, also functional food components, i.e. food components with a health benefit can be added to the flakes.

Emulsifiers, such as lecithin, SSL, tweens or casinates can be added to the flakes in amounts of 0.2 to 5 wt % in order to improve the oral mouthfeel and the dispersability of the flakes.

As stated above the processing of our flakes with the composition according to the invention is far easier now than disclosed for the known flakes of the prior art. This processing now comprises the following steps:

the fat is mixed with the sugar, if present and with the other dry ingredients of the composition at a temperature of 40 to 70° C., the mixture obtained is cooled in a direct heat exchanger to a temperature of less than 40° C., whereupon the mixture obtained is firmed by cooling it on a cooling belt by dosing it thereon and cooling to a temperature of less than 25° C., preferably 10 to 20° C. using a residence time of less than 8 minutes, preferably less than 4 min.

According to a last embodiment of our invention we want to indicate that also the bakery products or the snacks containing the edible fat system of the invention are part of the invention.

EXAMPLES

1. Labscale crystallisation trials were carried out with a number of fats and mixtures thereof. Details with NMR-values are given below.

TABLE 1

|  | N10 | N20 | N30 | N35 |
| --- | --- | --- | --- | --- |
| 100 PO44 | 90.8 | 80.5 | 55.6 | 39.4 |
| 100 PK39 | 94.5 | 85.9 | 34.9 | 12.5 |
| 85PO44/15RP | 76.2 | 64.2 | 42.8 | 29.2 |
| 100in(70POs/30PK) | 78.2 | 56.6 | 29.6 | 17.2 |
| 50BO43/50BO35 | 84.6 | 68.6 | 34.3 | 15.9 |
| 70PO58/30RP | 71.7 | 70.3 | 68.0 | 66.0 |
| 100in(65POs53/35PK39) | 84.6 | 66.9 | 38.9 | 23 |
| 100in(60PK39/40PO58) | 95.7 | 92.6 | 69.9 | 47.2 |
| 75in(60PK39/40PO58)/25RP | 72.9 | 63.9 | 42.9 | 26.7 |
| 90BO43/10PO58 | 88.9 | 80.1 | 57.1 | 41.4 |
| 100in(80dfPOs/20PK39) | 83.6 | 64.4 | 38.8 | 25.3 |

TABLE 1-continued

|  | N10 | N20 | N30 | N35 |
| --- | --- | --- | --- | --- |
| 100in(80dfPOs/20RP) | 54.4 | 39.3 | 22.8 | 15.5 |
| 10dfPOs | 76.8 | 61.8 | 42.1 | 32.9 |

With these fats the crystallisation speed measurements were carried out as mentioned before. Not only solids values were measured after 5 minutes but also after 2,10,20,40 minutes and intermediate times at 20° C. and similar measurements were done at 10° C. too.

The amount of solids formed after 5 minutes at 20° C. was used to evaluate the fats, because this comes the closes to the conditions required for exploitation on factory scale. The measurements at 20° C. were used to set our targets.

Explanation of the Type of Fats

PO44: partially hardened Palm oil with slip melting point of 44° C.

PK39: fully hardened Palm kernel oil with slip melting point of 39° C.

RP: Rapeseed oil (or Canola oil).

85PO44/15RP is a mixture of 85% PO44 and 15% Rapeseed oil dfPOs: Palm stearin (harder fraction of Palm oil obtained by dry fractionation) with slip melting point of 53° C.

in (70POs/30PK): at random interesterified mixture of 70% Palm stearin and 30% Palm kernel oil 50BO43/50BO35: a mixture of 50% partially hardened soybean oil (BO) with slip melting point of 43° C. and 50% of partially hardened BO with slip melting point of 35° C.

PO58: fully hardened Palm oil with slip melting point of 58° C.

In (65POs/35PK39): randomly interesteridied mixture of Palm stearin (65%) and fully hardened Palm kernel oil (35%)

In (60PK39/40PO58): randomly interesterified mixture of fully hardened Palm kernel oil and fully hardened Palm oil 90BO43/10PO58: mixture of 90% partially hardened BO with slipmelting point of 43° C. and 10% fully hardened Palm oil Example 1

In table 2 the measured data are given together with some other parameters of the fats. The results were ranked on the level of H3+H2E+H2M.

TABLE 2

|   |   | N20 | H3 + H2E + H2M | H2U | 5 min @ 20 | 5 min @ 20/ N20 |
|---|---|---|---|---|---|---|
| 1 | 70PO58/30RP | 70 | 70 | 1 | 69 | 0.99 |
| 2 | 100in(60PK39/40PO58) | 93 | 51 | 4 | 66 | 0.71 |
| 3 | 100PO44 | 81 | 42 | 21 | 50 | 0.62 |
| 4 | 100dfPOs | 62 | 41 | 37** | 39* | 0.62 |
| 5 | 75in(60PK39/40PO58)/25RP | 64 | 38 | 4 | 48 | 0.75 |
| 6 | 100in(80dfPOs/20PK39) | 64 | 37 | 28** | 41 | 0.63 |
| 7 | 85PO44/15RP | 64 | 35 | 18 | 40 | 0.62 |
| 8 | 100in(65POs53/35PK39) | 67 | 35 | 19 | 38* | 0.56 |
| 9 | 100inES35 | 57 | 29** | 22 | 29* | 0.51* |
| 10 | 90BO43/10PO58 | 80 | 28** | 5 | 55 | 0.69 |
| 11 | 100in(80dfPOs/20RP) | 39 | 23** | 28** | 20* | 0.50* |
| 12 | 100PK39 | 86 | 16** | 2 | 39* | 0.45* |
| 13 | 50BO43/50BO36 | 69 | 15** | 6 | 30* | 0.43* |

*not according to invention.
**outside preferred range, according to claim 2.

Fats 1–8 contain at least 30% H3+H2E+H2M, but fat 4 contains too high level of H2U and so crystallisation was not so good. In the same way blend 6 is less acceptable especially when it is cooled below 20° C. High H2U blends showed to crystallise slower when temperature is lowered further (which is the case in the cooling tunnel).

With fats 4 and 8 the 5 min@10 were resp 39 and 38 whilst with fats 1,2,3 and 5 the 5 min@10 was 48–69. So indeed with fat 4 the results were insufficient, while with fat 6 the results were not optimal.

The measurements can be ranked also in another way ie by ratio (Crystal 5:N20) to show the effectiveness of the fat; cf table 3.

TABLE 3

|   |   | N20 | H3 + H2E + H2M | H2U | 5 min @ 20 | 5 min @ 20/ N20 |
|---|---|---|---|---|---|---|
| 1 | 70PO58/30RP | 70 | 70 | 1 | 69 | 0.99 |
| 5 | 75in(60PK39/40PO58)/25RP | 64 | 38 | 4 | 48 | 0.75 |
| 2 | 100in(60PK39/40PO58) | 93 | 51 | 4 | 66 | 0.71 |
| 10 | 90BO43/10PO58 | 80 | 28 | 5 | 55 | 0.69 |
| 6 | 100in(80dfPOs/20PK39) | 64 | 37 | 28** | 41 | 0.63 |
| 4 | 100dfPOs | 62 | 41 | 37** | 39* | 0.62 |
| 7 | 85PO44/15RP | 64 | 33 | 18 | 40 | 0.62 |
| 3 | 100PO44 | 81 | 42 | 21 | 50 | 0.62 |
| 8 | 100in(65POs53/35PK39) | 67 | 35 | 19 | 38* | 0.56 |
| 9 | 100in(70POs/30PK) | 57 | 29** | 22 | 29* | 0.51* |
| 11 | 100in(80dfPOs/20RP) | 39 | 23** | 28** | 20* | 0.50* |
| 12 | 100PK39 | 86 | 16** | 2 | 39* | 0.45* |
| 13 | 50BO43/50BO36 | 69 | 15** | 6 | 30* | 0.43* |

It was concluded that at least 40% solids should be present after 5 min at 20° C. (5 min@20) to get the right hardness/snap, very effective fats have a 5 min@20/N20 of above 0.55.

Example 2

In a 1000 kg stirring Lank with heating jacket 136.1 kg PO44 (temperature 55° C.) is dosed. The stirring is switched on and 548 g powdered lecithin is added. Agitation is carried out for 10 minutes.

Then slowly following powders are added:
283.6 g of powdered sugar
68.2 kg of cinnamon ground
80 kg of sugar sanding The mixture is then rather dry and it is heated up to about 43° C. in another 20 minutes stirring.

The second part of 136.1 kg PO44 is added and the mass is mixed for about 5 minutes until a smooth mixture is obtained.

Then the other 80 kg sugar powdered and 160 kg sugar sanding is added slowly.

The mass is mixed until it is uniformly smooth and temperature is about 45° C.

This mixture is pumped to a runtank with heated jacket, where it is kept at 45–50° C., under slow agitation until it can be used for production.

From the runtank the mixture is cooled directly by means of a tubular heat exchanger, using cold water, to about 35° C. to get the right viscosity for dosing on the cooling belt.

The cooled mixture is divided over the full width of the cooling belt by a dispositor sheet and then the layer is divided in the length direction by a cutter to the size of the width of the final flakes.

The mixture on the cooler belt is then cooled further in the cooling tunnel with an air temperature of about 10° C. The residence time is about 2.5 minutes At the end of the belt the flakes are broken in smaller, after which the flakes are packed for distribution.

Examples 3 and 4

The procedure of example 2 was repeated, however using the ingredients according to the following recipes:

| Recipe 1 Components | Percentages | |
| --- | --- | --- |
| 6x sugar | 34.90% | 87.25 |
| granular sugar | 17.00% | 42.50 |
| pastry flour | 15.90% | 39.75 |
| flavour (1) | 1.65% | 4.13 |
| flavour (2) | 0.55% | 1.38 |
| lard | 30.00% | 75.00 |
| yellow #5 | | 0.05 |
| | | 250.00 |

(1) Givaudan Roure Natural Fresh Lemon 201
(2) Lemon Peel Granules #134616

| Recipe 2 | Percentage |
| --- | --- |
| lard | 30.00% |
| icing sugar | 18.60% |
| granular sugar | 11.00% |
| soy isoflavones (1) | 22.00% |
| ground cinnamon (2) | 9.00% |
| cinnamon flavour (3) | 2.00% |
| calcium carbonate | 6.10% |
| magnesium oxide | 1.30% |
| | 100.00% |

(1) Soylite: soylite complex micro 54x/499/M
(2) Cinnamon Ground McCormick
(3) Givaudan Rource: Spice N'Easy Cinnamon #810289

The products made could not be cut into flakes at room temperature, because they were too soft. Cutting had to be performed at −20° C. and even then the flakes were soft and fused into a mass when warmed to roomtemperature.

What is claimed is:

1. Edible fat based, flavoured fat system suitable for use in baked goods and snacks comprising:
   0 to 2 wt % of moisture;
   1 to 15 wt % of a flavouring system;
   25 to 90 wt % of a bakery compatible fat having a triglyceride composition and displaying a Crystal 5-value of at least 40%, while the ratio (Crystal 5:N20) between the amount of crystallised fat obtained after cooling the fat to 20° C. for 5 minutes (=Crystal 5) and the N-value obtained by NMR pulse on a non-stablised fat at 20° C. (=N20) is more than 0.55,
   0 to 80 wt % of sugar;
   0 to 70 wt % of a filler material;
   which edible fat based system has a particle size between 0.05 mm and 2.5 cm.

2. Edible fat based, flavoured fat system suitable for use in baked goods and snacks according to claim 1 wherein the bakery compatible fat has a triglyceride composition such that it comprises the triglycerides H3, H2M and H2E in a total amount (H3+H2M+H2E) of more than 30 wt % based on total glycerides present, and the triglycerides H2U in an amount of less than 25 wt % based on total glycerides, the balance being other glycerides based on H,M,U and E, wherein H=saturated fatty acid with 16–24 C-atoms; M=saturated fatty acids with 10–14 c-atoms; E=elaidic acid and U=mainly cis unsaturated fatty acids with at least 18 C-atoms.

3. Edible fat based fat system according to claim 1, wherein the bakery compatible fat is selected from the group consisting of partially and fully hardened vegetable oils, partially hardened soybean oil, partially hardened cotton seed oil, partially hardened sunflower oil, partially hardened rape seed oil, partially hardened palm oil, blends thereof with liquid oils and interesterified mixtures thereof.

4. Edible fat based fat system according to claim 1, wherein the flavouring system is selected from the group consisting of natural flavours from fruit, oranges, strawberries, raspberries, blueberries, goose berries, redberries, blackberries, apples, pears, peaches, apricots, from nuts, walnuts, hazelnuts, from spices or herbs, cinnamon, ginger, nutmeg, cloves, allspice, maple sugar, dehydrated maple syrup, from edible acids, citric acid, malic acid or lactic acid, from synthetic flavours imitating above natural flavours, from butter, from cheese, or mixtures thereof.

5. Edible fat based fat system according to claim 4 wherein the flavours are selected from the group consisting of:
   finely divided solid flavours; finely divided solid or liquid flavours on a solid carrier, liquid flavours, microcapsules containing a solid, or liquid, or gaseous flavour.

6. Edible fat based fat system according to claim 1 wherein the filler is selected from the group consisting of flour, starches (natural and modified), gums, hydrocolloids, maltodextrin, fibers, butter milk powder, skimmed milk powder, whey powder and cellulose.

7. Process for the preparation of an edible fat based fat system with the composition according to any of claims 1 to 6, comprising:
   mixing bakery compatible fat with the dry ingredients of the composition at a temperature of 40 to 70° C.
   cooling the mixture in a direct heat exchanger to a temperature of less than 40° C., and then firming the mixture obtained cooling it on a cooling belt to a temperature of less than 25° C., at a residence time of less than 8 minutes.

8. Bakery or snack products containing the edible fat based system according to any of claims 1 to 6.

* * * * *